(12) United States Patent
Yarden (10) Patent No.: US 7,597,668 B2
(45) Date of Patent: Oct. 6, 2009

(54) NON-INVASIVE TEMPERATURE MEASUREMENT

(75) Inventor: Moshe Yarden, Mevaseret Zion (IL)

(73) Assignee: Medisim Ltd., Airport (IL)

( * ) Notice: Subject to any disclaimer, the term of this patent is extended or adjusted under 35 U.S.C. 154(b) by 44 days.

(21) Appl. No.: 11/444,710

(22) Filed: May 31, 2006

(65) Prior Publication Data

US 2007/0282218 A1 Dec. 6, 2007

(51) Int. Cl.
*A61B 5/00* (2006.01)
*G01K 3/00* (2006.01)

(52) U.S. Cl. ............... 600/549; 374/102; 374/107; 374/110

(58) Field of Classification Search ........... 600/549; 374/112, 142, 100, 101, 107, 110, 113, 120, 374/121, 134, 158
See application file for complete search history.

(56) References Cited

U.S. PATENT DOCUMENTS

| 4,183,248 | A |   | 1/1980 | West |
|---|---|---|---|---|
| 4,411,266 | A |   | 10/1983 | Cosman |
| 4,563,098 | A |   | 1/1986 | Bartran |
| 4,955,380 | A |   | 9/1990 | Edell |
| 5,057,106 | A |   | 10/1991 | Kasevich et al. |
| 5,255,979 | A |   | 10/1993 | Ferrari |
| 5,323,650 | A | * | 6/1994 | Fullen et al. ............ 73/172 |
| 5,573,004 | A |   | 11/1996 | Groenke |
| 5,879,082 | A |   | 3/1999 | Smitherman et al. |
| 5,957,961 | A |   | 9/1999 | Maguire et al. |
| 6,090,050 | A | * | 7/2000 | Constantinides .......... 600/549 |
| 6,146,015 | A |   | 11/2000 | Weiss |
| 6,220,750 | B1 | * | 4/2001 | Palti .................... 600/475 |
| 6,280,397 | B1 | * | 8/2001 | Yarden et al. ............. 600/549 |
| 6,292,685 | B1 |   | 9/2001 | Pompei |
| 6,934,220 | B1 | * | 8/2005 | Cruitt et al. .............. 368/10 |
| 2002/0150143 | A1 |   | 10/2002 | Tokita et al. |
| 2002/0191675 | A1 |   | 12/2002 | Tokita et al. |
| 2003/0231696 | A1 |   | 12/2003 | Kihira et al. |

(Continued)

FOREIGN PATENT DOCUMENTS

| JP | 2002-372464 | 12/2002 |
|---|---|---|
| JP | 2003-075262 | 3/2003 |

OTHER PUBLICATIONS

Science Links Japan. Jul. 1, 2008. Takashi et al. "Usefulness of Monitoring Forehead Deep-tissue Temperature as an Index of Core Temperature in Adult Patents . . . " Japanese Journal of Anesthesiology. vol. 52 No. 10 p. 1066-1073. 2003.*

(Continued)

*Primary Examiner*—Max Hindenburg
*Assistant Examiner*—Adam J Eiseman
(74) *Attorney, Agent, or Firm*—Abelman, Frayne & Schwab (57) ABSTRACT

A thermometric device includes a probe having a membrane configured to be applied to an external surface of a body of a subject and one or more temperature sensors located within the probe in thermal contact with the membrane. A processing unit is configured to receive temperature readings from the one or more temperature sensors, to determine time-dependent parameters of temperature change responsively to the temperature readings, to calculate a local temperature of the body using a function including the time-dependent parameters, and to calculate a core body temperature by correcting for a difference between the core body temperature and the local temperature.

37 Claims, 2 Drawing Sheets

U.S. PATENT DOCUMENTS

| | | | | |
|---|---|---|---|---|
| 2005/0043631 A1* | 2/2005 | Fraden | ........................ | 600/474 |
| 2005/0094705 A1* | 5/2005 | Chi | ............................ | 374/121 |
| 2005/0197540 A1* | 9/2005 | Liedtke | ...................... | 600/300 |
| 2006/0047214 A1* | 3/2006 | Fraden | ........................ | 600/513 |
| 2007/0027403 A1* | 2/2007 | Kosted | ........................ | 600/549 |

OTHER PUBLICATIONS

"Core temperature measurement: a comparison of axilla, tympanic membrane and pulmonary artery blood temperature", by Fullbrook, Intensive critical care nursing, Oct. 1997. 13(5): 266-272.
U.S. Appl. No. 60/572,651.

* cited by examiner

NON-INVASIVE TEMPERATURE MEASUREMENT

FIELD OF THE INVENTION

The present invention relates generally to health care and specifically to methods and systems for rapid measurement of subject temperature.

BACKGROUND OF THE INVENTION

The measurement of a body temperature is useful for assessing the health of a subject. Typically, a body temperature is measured by a thermometer positioned in a body cavity, such as the mouth, the axilla, or the rectum. A core body temperature, commonly measured in the pulmonary artery, is generally considered a better indicator of a subject's health than peripheral temperatures of the aforementioned body cavities or of external locations, such as the subject's forehead or temple area.

A variety of thermometry devices are used to measure body temperatures. U.S. Pat. No. 6,280,397 to Yarden et al., whose disclosure is incorporated herein by reference, provides a high speed temperature measuring device for measuring an internal body temperature by insertion of the device into a body cavity. A heat conduction transfer equation is solved to determine the internal body temperature.

Insertion of a thermometer into a body cavity is an invasive measurement that generally causes some discomfort to the subject. Invasive measurement may also require the subject's cooperation and adherence to measurement procedures, such as keeping a thermometer tip under the tongue during oral temperature measurement. Non-invasive temperature measurement at an external measurement site, such as a subject's forehead, may be less discomforting and less dependent on subject cooperation. However, a large statistical deviation may exist between the temperature at an external measurement site and the core body temperature.

The poor correlation between external and peripheral temperatures with the core body temperature is described by Fullbrook in "Core temperature measurement: a comparison of axilla, tympanic membrane and pulmonary artery blood temperature," *Intensive Critical Care Nursing*, Oct. 1997, 13(5):266-72, whose disclosure is incorporated herein by reference.

U.S. Pat. No. 6,292,685 to Pompei, whose disclosure is incorporated herein by reference, provides a method of detecting human body temperature by laterally scanning an infra-red (IR) temperature detector across a forehead and providing a peak temperature reading from multiple readings.

SUMMARY OF THE INVENTION

Embodiments of the present invention provide apparatus and methods for determining core body temperature based on temperature measurements at the body surface.

A thermometer configured to make non-invasive body temperature measurements includes a probe with an outer, heat-conducting membrane designed to be placed non-invasively against the skin of a subject. In some embodiments, multiple temperature sensors within the probe provide temperature readings at multiple respective thermal distances from the body surface. The temperature readings may be used to determine time-dependent parameters of temperature changes at the respective thermal distances. These temperature changes may be used to rapidly compute a deep tissue temperature of the body, using a heat flux calculation similar to that described in the above-mentioned U.S. Pat. No. 6,280,397, for example. The deep tissue temperature, referred to hereinbelow as the local temperature, reflects a temperature at a location under the skin that is the source of heat conducted to the sensors in the probe.

The thermometer is configured to perform the heat flux calculation so as to derive a value of the local temperature. The local temperature, together with the temperature measurements and the time dependent parameters of temperature change may then be used to calculate a core body temperature. The calculation is typically based on an empirically-derived formula based on the aforementioned parameters.

After the core body temperature is determined, the thermometer may display the temperature on a screen built into the thermometer.

The thermometer may be configured as a handheld thermometer that is held against the body surface or as a patch thermometer affixed to the body. The thermometer may include additional features such as a radio transceiver for telemetry purposes and/or a timer for measuring intervals at which medication is provided.

To ensure that the contact between the probe membrane and the skin is maintained at a sufficient and relatively consistent pressure, the probe may be made of a compressible material, such as silicone. A pressure sensor also may be comprised in the probe to sense that a consistent pressure is achieved. A handheld thermometer may also include a flexible joint that compensates for angular movements between the thermometer and the subject.

There is therefore provided, in accordance with an embodiment of the present invention, a thermometric device, including:

a probe, including:

a membrane configured to be applied to an external surface of a body of a subject; and one or more temperature sensors located within the probe in thermal contact with the membrane; and a processing unit configured to receive temperature readings from the one or more temperature sensors, to determine time-dependent parameters of temperature change responsively to the temperature readings, to calculate a local temperature of the body using a function including the time-dependent parameters, and to calculate a core body temperature by correcting for a difference between the core body temperature and the local temperature.

Typically, the one or more temperature sensors include a plurality of temperature sensors at differing, respective thermal distances from the membrane, and the processing unit is adapted to process the temperature readings responsively to the different thermal distances in order to calculate the core body temperature.

The plurality of temperature sensors may include at least three temperature sensors, and the processing unit may be configured to select a subset of the temperature sensors and to determine the local temperature of the body responsively to the temperature readings provided by the subset.

In some embodiments, a first of the plurality of temperature sensors has a first thermal sensitivity and a second of the plurality of temperature sensors has a second thermal sensitivity.

An insulating material is generally interposed between at least one of the temperature sensors and the membrane in order to define the differing thermal distances. In some embodiments, the insulating material includes a printed circuit.

In further embodiments, the temperature sensors include a first temperature sensor in proximity to the membrane and a second temperature sensor stacked on the first temperature sensor so that a thermal distance of the second temperature sensor from the membrane includes the first temperature sensor.

A contour of the membrane may be configured so as to cause skin of the body to conform to the contour.

In some embodiments, the device includes a handheld meter, and the probe is attached by a joint to the handheld meter. The joint may be flexible.

In some embodiments, the probe and processing unit are physically separated. The probe may be compressible. Additionally or alternatively, the device may include a wireless transmitter, for transmitting the temperature readings from the probe to the processing unit.

The device may also include a pressure sensor configured to indicate that an appropriate pressure is applied between the membrane and the external surface of the body.

Typically, the device includes a display, on which is displayed the core body temperature.

In some embodiments, the probe is configured to be affixed to the external surface of the body. In these embodiments, an adhesive material may be used to affix the device to the body. Alternatively or additionally, a timer may be included to measure intervals between administrations of a medication to the subject.

Typically, the processor is operative to calculate the core body temperature responsively to sensing a change in a temperature reading from the one or more temperature sensors.

In one embodiment, the probe includes a pressure sensor, which is adapted to measure a pressure of the probe against the body surface, and the processing unit is operative to use the measured pressure in determining the core body temperature.

There is also provided, in accordance with an embodiment of the present invention, a patient care device, including:

a probe for application to an external surface of a body of a subject, the probe including one or more temperature sensors for determining a temperature of the subject; and a timer for measuring and indicating intervals between administrations of a medication to the subject.

There is further provided a method for thermometric measurement, including:

applying a probe, which includes a heat-conducting membrane and one or more temperature sensors in thermal communication with the membrane, to an external surface of a body of a subject;

receiving temperature readings from the one or more temperature sensors while the probe is applied to the surface of the body;

determining time-dependent parameters of temperature change responsively to the temperature readings;

calculating a local temperature of the body using a function including the time-dependent parameters; and calculating a core body temperature by correcting for a difference between the core body temperature and the local temperature.

Typically, the one or more temperature sensors include a plurality of temperature sensors at differing, respective thermal distances from the membrane, and calculating the local and core body temperatures includes processing the temperature readings responsively to the different thermal distances in order to calculate the core body temperature.

When the plurality of temperature sensors includes at least three temperature sensors, calculating the local temperature of the body may include selecting a subset of the temperature sensors and calculating the local temperature responsively to the temperature readings provided by the subset.

In some embodiments, applying the probe includes indicating that an appropriate pressure is applied between the membrane and the external surface of the body in order to receive the temperature readings.

Applying the probe may include using an adhesive patch to affix the probe to the body. In some embodiments, the method includes transmitting the temperature of the body from the probe to a telemetry receiver. The method may also include measuring intervals, using the probe, between administrations of a medication to the subject.

Calculating the core body temperature may include determining the core body temperature responsively to sensing a change in a temperature reading from the one or more temperature sensors.

Alternatively, calculating the core body temperature may include determining the core body temperature responsively to sensing a pressure change on the membrane.

In some embodiments, the method includes using a pressure measurement to correct for a difference between the core body temperature and the local temperature.

The present invention will be more fully understood from the following detailed description of the embodiments thereof, taken together with the drawings in which:

DETAILED DESCRIPTION OF EMBODIMENTS

In the embodiments of the present invention that are described below, core body temperature is determined based on measurements made at a surface of a body of a subject.

Figure 1:
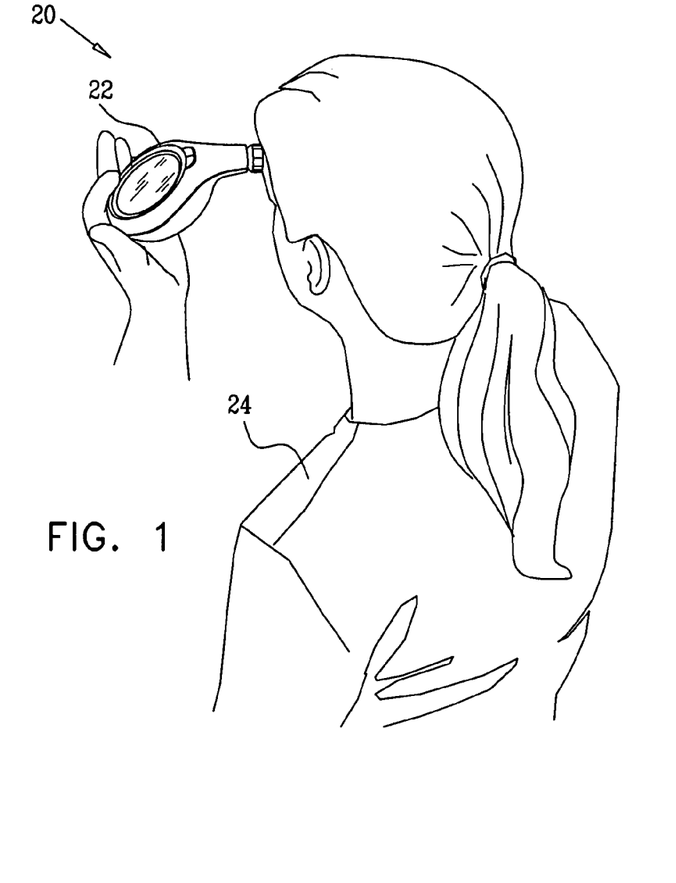
FIG. 1 is a schematic, pictorial illustration of a system for non-invasive body temperature measurement using a handheld thermometer, in accordance with an embodiment of the present invention.

FIG. 1 is a schematic, pictorial illustration of a system 20 in which a thermometric device, such as a thermometer 22, is used to determine the core body temperature of a subject 24, in accordance with an embodiment of the present invention. In system 20, thermometer 22 is a handheld device configured to be held against the forehead of subject 24 for a measurement period that is typically less than six seconds. It is to be understood that the forehead is one of several suitable temperature measurement sites on the body and that thermometer 22 may be configured to operate at other measurement sites, as described further hereinbelow (FIG. 2).

In alternative embodiments, also described hereinbelow (FIG. 5), a thermometer for measuring core body temperature may be configured as a patch rather than as a handheld device. Common to both the handheld and patch configurations is a probe 26 comprising multiple temperature sensors, as described further hereinbelow (FIGS. 2-4).

Figure 2:
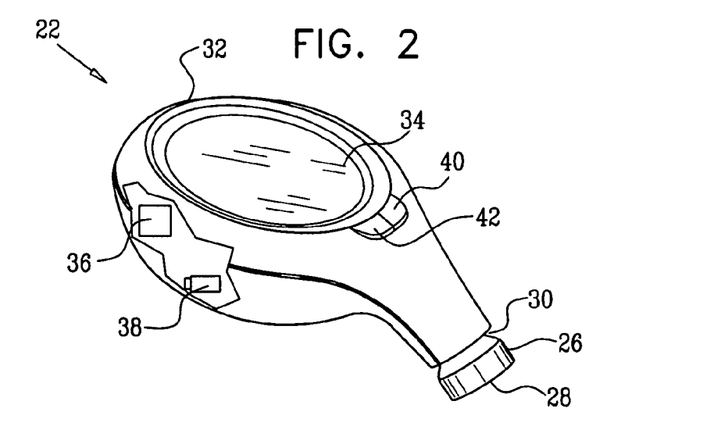
FIG. 2 is a schematic, pictorial illustration of a handheld thermometer, in accordance with an embodiment of the present invention.

FIG. 2 is a schematic, pictorial illustration of thermometer 22, in accordance with an embodiment of the present invention. Thermometer 22 comprises probe 26 to which is affixed a heat conducting membrane 28. Membrane 28 is designed to be placed against a temperature measurement site on the body of the subject. Typically, membrane 28 has a diameter of 5-25 mm. In some embodiments, the contour of membrane 28 is slightly convex or concave so as to improve the contact between the membrane and the body. When the membrane is concave, having a concave depression of not more than 2 mm, the membrane conforms to slight protrusions or bumps on the body surface. When the membrane is convex, it pushes into the skin. In either case, a consistent thermal contact with the skin is made across the entire surface of the membrane.

Figure 3:
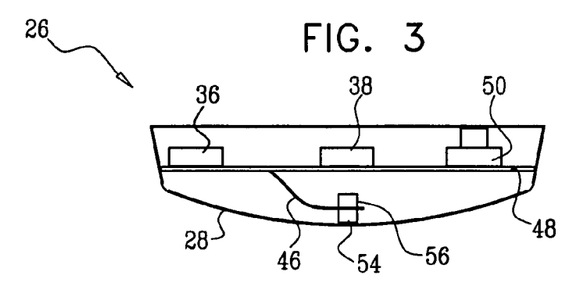
FIG. 3 is a schematic, cut-away side view of a temperature probe, in accordance with an embodiment of the present invention.

Within probe 26 and in close proximity to membrane 28 are temperature sensors described further hereinbelow (FIGS. 3 and 4).

Probe 26 is attached by a flexible joint 30 to a handheld meter 32. Due to the flexibility of joint 30, a good thermal contact may be maintained between membrane 28 and the measurement site even when the handheld meter is not held at an exact right angle to the measurement site. The flexible joint also ensures good thermal contact if the subject moves during the measurement period. In certain embodiments, the joint is also compressible, or comprises a compressible sleeve, which further compensates for any movement of the subject relative to the handheld meter. Additionally or alternatively, probe 26 may itself be compressible or may comprise a compressible sleeve made of silicone.

Handheld meter 32 further comprises a processing unit 36 and a power source, such as a battery 38. In certain embodiments, handheld meter 32 also comprises one or more manual control buttons, such as a power switch 40 and a mode button 42, described further hereinbelow. In some alternative embodiments, some or all of the aforementioned elements comprised in handheld meter 32 may be configured within probe 26. For example, processing unit 36 and battery 38 may be configured within probe 26, as illustrated below in FIG. 3.

An operator of thermometer 22, who may be subject 24 himself or a healthcare giver who applies thermometer 22 to subject 24, may turn on thermometer 22 by pressing power switch 40. An indication of power is provided on a screen 34, which is a thin panel screen, such as a liquid crystal display (LCD) screen. In some embodiments, the operator may also use mode button 42 to set measurement parameters, such as the site at which the temperature measurement is to be made. For example, a list of possible measurement sites, such as forehead, temple, and neck, may appear on screen 34, and the operator may make a selection from the list.

Processing unit 36 receives temperature readings from temperature sensors comprised in probe 26 and performs a temperature measurement process to determine a core body temperature, as described further hereinbelow. Processing unit 36 may display the determined core body temperature on screen 34. Processing unit 36 also may signal that the core body temperature has been determined by sounding an audible beep. As described above, the determination typically is made within six seconds of starting the measurement. This period is sufficiently brief to prevent the heat conductance of the thermometer and in particular of membrane 28 from affecting the temperature of at the measurement site.

In a further embodiment, mode switch 42 also activates a timer for measuring intervals between medications. When the timer is activated, screen 34 may display elapsed time in a format of "hours:minutes:seconds." After a desired interval of time has elapsed, processing unit 36 may provide an indication, such as an audible beep. Timing of medication intervals may be utilized to prevent medication overdosing.

FIG. 3 is a schematic, cut-away side view of probe 26, in accordance with an embodiment of the present invention. Probe 26 comprises two temperature sensors, illustrated in the figure as a first temperature sensor 54, which is situated in direct thermal contact with membrane 28, and a second temperature sensor 56, situated farther away from membrane 28. Sensors 54 and 56 may be thermistors or Resistance Temperature Detectors (RTDs) or any form of temperature sensor known in the art.

In this embodiment, sensors 54 and 56 are mounted on either side of a printed electronic circuit, such as a flexible circuit 46. Consequently, sensor 54 is at a thermal distance of zero from membrane 28, whereas the thermal distance of sensor 56 from membrane 28 comprises both the thickness of flexible circuit 46 and the thickness of sensor 54. Alternatively, insulating materials other than a printed circuit may be used to provide the thermal distance between sensor 56 and membrane 28. For example, in an alternative configuration, sensor 56 may be mounted on the same side of sensor 54 but with no direct contact to membrane 28 such that the thermal distance between sensor 56 and the membrane comprises an air gap.

Flexible circuit 46 is connected to a printed circuit board (PCB) 48. PCB 48 may be positioned within probe 26 or within handheld meter 32. Flexible circuit 46 may provide electrical connections that connect the sensors to processing unit 36, which may be mounted on PCB 48.

A pressure sensor 50, may also be mounted on PCB 48 and may be configured to sense the pressure applied between membrane 28 and the measurement site. Sensor 50 sends a pressure signal to processing unit 36, which may indicate that an appropriate pressure is being applied by displaying a notification on screen 34 or by sounding an audible beep. A signal from sensor 50 to processing unit 36 may also be used to indicate that probe 26 is in place at the measurement site and that the temperature measurement process described hereinbelow may begin. Alternatively, a temperature change at sensor 54 may be used to initiate the temperature measurement process.

Pressure readings from pressure sensor 50 may also be provide a correction factor for the calculation of core body temperature, as described further hereinbelow.

PCB 48 also may comprise heating elements, such as resistors, not shown, that maintain a pre-determined initial temperature within the probe, such as 30° C.

When probe 26 is placed against the measurement site on the body of subject 24, heat is conducted from the body through membrane 28 to sensors 54 and 56. The rate of heat flux transferred to the probe is proportional to the difference between the thermal distances to sensors 54 and 56.

Processing unit 36 performs the temperature measurement process by sampling temperature readings from each sensor at sample time intervals and calculating from these readings a core body temperature. In one embodiment, the sample time interval is 0.4 seconds. Using the heat flux algorithm described in the above-mentioned U.S. Pat. No. 6,280,397 (referred to hereinbelow as the '397 algorithm), the processing unit calculates from the temperature readings a local temperature. The local temperature, also referred to as a deep tissue temperature, reflects a temperature at a location under the skin that is the source of heat conducted to the sensors in the probe. The '397 algorithm is based on solving a heat conduction equation by utilizing multiple temperature readings, preferably, though not necessarily, from more than one sensor. Alternatively, other algorithms based on prediction and/or heat conduction may be used to determine the local temperature from sensor temperature readings.

The local temperature determined by the '397 algorithm is less affected than the surface temperature at the measurement site is to external factors such as ambient temperature and humidity. The local temperature is also less subject to variations in the body's heat regulation at the body's extremities. Consequently, there is a closer correlation between local temperature and core body temperature than there is between surface temperature and core body temperature.

In order to determine the core body temperature, processing unit 36 computes and applies an empirically-determined formula, which is described in detail in an Appendix hereinbelow. The formula is based on fitting a linear equation comprising several temperature-related parameters to clinically measured values of core body temperature. The temperature related parameters include sensor temperature readings, time-dependent temperature rates of change, and the value of local body temperature determined by the '397 algorithm. The formula is based on temperature readings made at a subject's forehead, using a two-sensor probe. Alternative empirical formulas may be derived for alternative measurement sites and for probes with one sensor, or for probes with three or more sensors. Empirical formulas may also be derived that account for variations in pressure as measured by pressure sensor 50. When the probe is not firmly pressed against the measurement site, there will be a lower level of thermal contact, which increases the deviation between the temperature readings and the core body temperature. The deviation may be corrected by using measured pressure values in the empirical formula.

FIGS. 4A-4E are schematic, side views of different configurations of temperature sensors within probe 26, in accordance with an embodiment of the present invention. In all of FIGS. 4A-4E, first sensor 54, described above with respect to FIG. 3, is mounted in direct thermal contact with membrane 28. In alternative embodiments, not shown, first sensor 54 may also be separated from the membrane by a thermal distance.

Figure 4A:
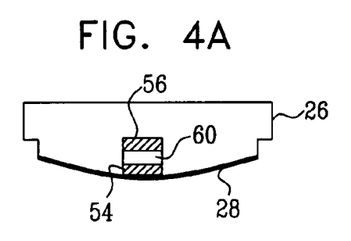
FIGS. 4A-4E are schematic, pictorial illustrations of temperature sensors within the temperature probe, in accordance with an embodiment of the present invention.

The configuration of sensors in the embodiment of FIG. 4A is essentially identical to the configuration of FIG. 3. First sensor 54 and second sensor 56 are stacked, with a thermal insulating material 60 separating the two sensors. Insulating material 60 may comprise flexible circuit 46 described hereinabove. In an embodiment, insulating material 60 may comprise materials other than flexible circuit 46, and electrical signal and power connections to the sensors may be provided by electrical means other than flexible circuit 46 (e.g., by electrical wires).

Figure 4B:
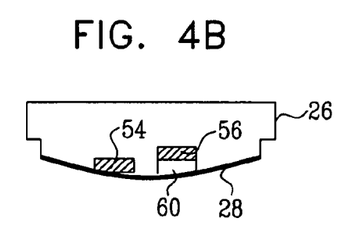

The embodiment of FIG. 4B differs from that of FIG. 4A in that the two sensors are not stacked. Rather, the thermal distance of sensor 56 is comprised solely of insulating material 60, which separates second sensor 56 from membrane 28.

Figure 4C:
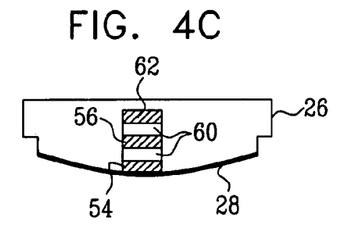

The embodiment of the probe shown in FIG. 4C comprises an additional, third sensor 62, which is stacked above sensors 54 and 56. Each sensor is separated from the sensor below by a layer of thermal insulating material 60, such that the thermal distance of sensor 62 comprises sensors 54 and 56, as well as two layers of insulating material. Both layers of insulating material may be printed circuit layers, or may be comprised of other heat insulating materials, which may be configured with differing thicknesses.

Figure 4D:
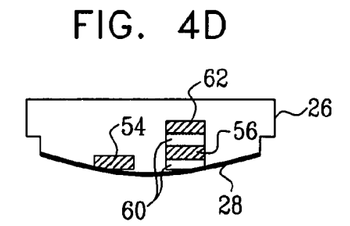
Figure 4E:
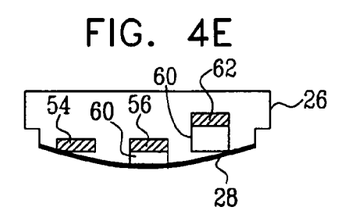

FIGS. 4D and 4E show additional configurations of the three sensors, 54, 56, and 60, with and without some stacking. In the embodiment of FIG. 4D, two of the sensors are stacked, while a third is not. In the embodiment of FIG. 4E, none of the three sensors are stacked. It is to be understood that in additional embodiments, more sensors may also be configured in various locations with various stacking configurations, and with varying thermal distances. Furthermore, sensors configured in probe 26 may vary in their dimensions and sensitivities.

The data provided by additional sensors in embodiments configured with three or more sensors may be used to compute temperature with greater accuracy and/or speed than in embodiments that use only one or two sensors. In embodiments with additional sensors, processing unit 36 may use all or a subset of the sensors to determine the body temperature. For example, the processing unit may determine during the measurement process that certain sensors are not operating in their optimal ranges. Such sensors may include one that is configured for high thermal sensitivity and becomes saturated before an accurate temperature determination has been made, or a less sensitive sensor that detects only a negligible temperature change. Typically, thermal sensitivity a function of the structure of a sensor and its thermal distance to the measured heat source. Processing unit 36 may reject input from sensors operating outside of their optimal range. A determination of the core body temperature then is made using temperature readings from a subset of at least two sensors. The varying parameters of dimension, sensitivity, location, and thermal distance influence the optimal range of the sensors.

Figure 5:
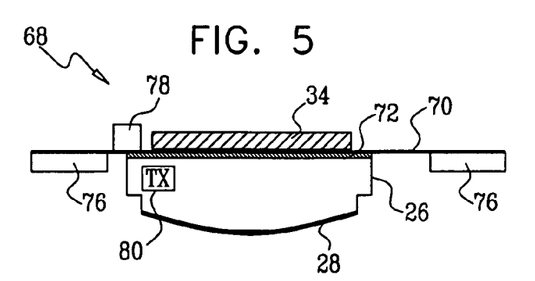
FIG. 5 is a schematic, cut-away side view of a patch thermometer, in accordance with an embodiment of the present invention.

FIG. 5 is a schematic, side view of a temperature thermometer configured as a patch thermometer 68, in accordance with an embodiment of the present invention. Patch thermometer 68 is configured to be affixed to the body surface, rather than to be held in the manner of thermometer 22.

Patch thermometer 68 comprises a patch base 70, which typically comprises a soft, durable material, such as is used for many types of medical patches. Patch thermometer 68 also comprises an adhesive material 76 so that the patch thermometer may be affixed to the skin. Alternatively, the patch thermometer may comprise a strap, not shown, that may encircle a part of the body, such as a limb, torso, or head, thereby binding the patch thermometer to the body. Patch thermometer 68, like the handheld thermometer 22, comprises probe 26 and membrane 28. In this embodiment, probe 26 is mounted to patch base 70 by means of a compressible material 72 to further accommodate a contour of the body at the measurement site and to ensure that a consistent pressure is applied.

Patch thermometer 68 may also comprise additional elements similarly comprised in handheld thermometer 22, such as screen 34, shown in the figure, as well as a processing unit and a power supply, not shown in FIG. 5. The screen may be used, together with a suitable pushbutton 78, to display the time elapsed since the last dose of medication given to this patient and/or the time until the next dose should be administered, as described above, in order to assist the caregiver in administering the proper dosage at proper times.

Additionally or alternatively, patch thermometer 68 may comprise a wireless transmitter 80, for transmitting temperature readings to a monitoring station or other receiver. The processing unit may thus be physically separated from the probe that is applied to the body.

After patch thermometer 68 is affixed or bound to the body, the temperature measurement process is essentially identical to the process described above with respect to the handheld thermometer.

Although the embodiments described above relate specifically to the measurement of temperature of a human body, the principles of the present invention may also be applied to other types of measurements, such as heat flux, and to other types of animate and inanimate bodies. Furthermore, although these embodiments make reference to certain types of fast, external measurement processes, the principles of the present invention may likewise be applied in the context of other processes, such as continuous temperature monitoring.

It will thus be appreciated that embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

APPENDIX

U.S. Pat. No. 6,280,397, provides a method for rapidly determining a core body temperature based on heat flux through a thermometer when the thermometer is inserted into an orifice of the body. The accuracy of the derived temperature of U.S. Pat. No. 6,280,397 is diminished when temperature measurements are made at an external measurement site on the body.

In an embodiment of the present invention, an empirically-derived formula is used by the processing unit to determine core body temperature based on temperature readings made by sensors within the probe when the probe is applied to an external body surface. The algorithm uses temperature readings from two sensors: a first sensor positioned at a shorter thermal distance from the thermometer membrane, and a second sensor at a farther distance.

The empirically-derived formula for the core body temperature is given as a sum of factors, as follows (units are in degrees centigrade):

$$\text{Core Body Temperature} = C_5 \cdot T_{b10-2} + C_{rdot5} \cdot T_{rdot5} + C_{bdot5} \cdot T_{bdot5} + C_{r10} \cdot T_{r10} + C_{b10} \cdot T_{b10} + C_3 \cdot T_{avg} + C_4 \cdot (T_{avg})^2 + C_7 \cdot (T_{avg})^3 + C_6$$

In an exemplary embodiment, the constants used in the formula have the values shown in the following table:

| C5 | Crdot5 | Cbdot5 | Cr10 | Cb10 | C3 | C4 | C7 | C6 |
|---|---|---|---|---|---|---|---|---|
| 0.2912 | 4.6451 | −5.6806 | −0.0891 | 0.4504 | −3.5611 | 0.5801 | −0.0264 | 41.08 |

The variables in the formula are given below. A typical interval between temperature readings is 0.4 seconds. (In alternative embodiments, a batch of temperature readings may be made a short intervals, such as 0.4 seconds, and averages of each batch may be used instead of individual readings.)

$T_{b10-2}$—The difference between the reading of the first sensor after 10 intervals and the first reading of the first sensor after 2 intervals.

$T_{rdot5}$—The rate of change of the temperature of the second sensor after 5 intervals (in degrees/sec).

$T_{bdot5}$—The rate of change of the temperature of the first sensor after 5 intervals (in degrees/sec).

$T_{r10}$—The reading of the second sensor after 10 intervals.

$T_{b10}$—The reading of the first sensor after 10 intervals.

$T_{avg}$—the heat-flux derived temperature of U.S. Pat. No. 6,280,397.

Alternative formulas based on the principles of the present invention will be apparent to those skilled in the art based on the above disclosure, and are considered to be within the scope of the present invention.

The invention claimed is:

1. A thermometric device, comprising:
    a probe, comprising:
        a membrane configured to be applied to an external surface of a body of a subject; and
        one or more temperature sensors located within the probe in thermal contact with the membrane; and
    a processing unit configured to receive a plurality of temperature readings from the one or more temperature sensors, to determine time-dependent parameters of temperature change responsively to the plurality of temperature readings, to calculate, a deep tissue temperature of the body at a location under the skin that is a source of heat conducted to the one or more temperature sensors, and to calculate a core body temperature by correcting for a difference between the core body temperature and the deep tissue temperature.

2. The device according to claim 1, wherein the one or more temperature sensors comprise a plurality of temperature sensors at differing, respective thermal distances from the membrane, and wherein the processing unit is adapted to process the plurality of temperature readings responsively to the different thermal distances in order to calculate the core body temperature.

3. The device of claim 2, wherein the plurality of temperature sensors comprises at least three temperature sensors, and wherein the processing unit is configured to select a subset of the temperature sensors and to determine the deep tissue temperature of the body responsively to the plurality of temperature readings provided by the subset.

4. The device of claim 2, wherein a first of the plurality of temperature sensors has a first and a second of the plurality of temperature sensors has a second structure.

5. The device of claim 2, and comprising an insulating material, which is interposed between at least one of the temperature sensors and the membrane in order to define the differing thermal distances.

6. The device of claim 5, wherein the insulating material comprises a printed circuit.

7. The device of claim 2, wherein the temperature sensors comprise a first temperature sensor in proximity to the membrane and a second temperature sensor stacked on the first temperature sensor so that a thermal distance of the second temperature sensor from the membrane comprises the first temperature sensor.

8. The device of claim 1, wherein a contour of themembrane is configured so as to cause skin of the body to conform to the contour.

9. The device of claim 1, wherein the device comprises a handheld meter, and wherein the probe is attached by a joint to the handheld meter.

10. The device of claim 9, wherein the joint is flexible.

11. The device of claim 1, wherein the probe and processing unit are physically separated.

12. The device of claim 11, wherein the probe is compressible.

13. The device of claim 11, and comprising a wireless transmitter, for transmitting plurality of temperature readings from the probe to the processing unit.

14. The device of claim 1, and comprising a pressure sensor configured to indicate that an appropriate pressure is applied between the membrane and the external surface of the body.

15. The device of claim 1, and comprising a display, to display the core body temperature.

16. The device of claim 1, wherein the probe is configured to be affixed to the external surface of the body.

17. The device of claim 16, and comprising an adhesive material for affixing the device to the body.

18. The device of claim 1, and comprising a timer to measure intervals between administrations of a medication to the subject.

19. The device of claim 1, wherein the processor is operative to calculate the core body temperature responsively to sensing a change in a temperature reading from the one or more temperature sensors.

20. The device of claim 1, wherein the probe comprises a pressure sensor, which is adapted to measure a pressure of the probe against the body surface, and wherein the processing unit is operative to use the measured pressure in determining the core body temperature.

21. A method for thermometric measurement, comprising:
applying a probe, which comprises a heat-conducting membrane and one or more temperature sensors in thermal communication with the membrane, to an external surface of a body of a subject;
receiving a plurality of temperature readings from the one or more temperature sensors while the probe is applied to the surface of the body;
determining time-dependent parameters of temperature change responsively to the plurality of temperature readings;
calculating a deep tissue temperature of the body at a location under the skin that is a source of heat conducted to the one or more temperature sensors; and
calculating a core body temperature by correcting for a difference between the core body temperature and the deep tissue temperature.

22. The method of claim 21, wherein the one or more temperature sensors comprise a plurality of temperature sensors at differing, respective thermal distances from the membrane, and wherein calculating the deep tissue and core body temperatures comprises processing the plurality of temperature readings responsively to the different thermal distances in order to calculate the core body temperature.

23. The method of claim 22, wherein the plurality of temperature sensors comprises at least three temperature sensors, and wherein calculating the deep tissue temperature of the body comprises selecting a subset of the temperature sensors and calculating the deep tissue temperature responsively to the plurality of temperature readings provided by the subset.

24. The method of claim 22, wherein a first of the plurality of temperature sensors has a first structure and a second of the plurality of temperature sensors has a second structure.

25. The method of claim 22, and comprising interposing between at least one of the plurality of temperature sensors and the membrane an insulating material to define the differing thermal distances.

26. The method of claim 22, wherein the temperature sensors comprise a first temperature sensor in proximity to the membrane and a second temperature sensor stacked on the first temperature sensor so that a thermal distance of the second temperature sensor from the membrane comprises the first temperature sensor.

27. The method of claim 21, wherein a contour of the membrane is configured so as to cause skin of the body to conform to the contour.

28. The method of claim 21, wherein applying the probe comprises indicating that an appropriate pressure is applied between the membrane and the external surface of the body in order to receive the plurality of temperature readings.

29. The method of claim 21, wherein applying the probe comprises using an adhesive patch to affix the probe to the body.

30. The method of claim 29, and comprising transmitting the plurality of temperature readings from the probe to a telemetry receiver.

31. The method of claim 21, and comprising measuring intervals, using the probe, between administrations of a medication to the subject.

32. The method of claim 21, wherein calculating the core body temperature comprises determining the core body temperature responsively to sensing a change in a temperature reading from the one or more temperature sensors.

33. The method of claim 21, wherein calculating the core body temperature comprises determining the core body temperature responsively to sensing a pressure change on the membrane.

34. The method of claim 21, and comprising measuring a pressure of the probe against the body surface, wherein calculating the core body temperature comprises correcting for the difference between the core body temperature and the deep tissue temperature responsively to the measured pressure.

35. The method of claim 21, wherein calculating the deep tissue temperature comprises estimating the deep tissue temperature by solving a time dependent heat conduction transfer equation, and wherein correcting for the difference between the core body temperature and the deep tissue temperature comprises computing a polynomial function of the deep tissue temperature.

36. The device of claim 1 and wherein said processing unit employs a function comprising said time-dependent parameters for calculating said deep tissue temperature.

37. The method of claim 21 and wherein said calculating said deep tissue temperature comprises using a function comprising said time-dependent parameters.

* * * * *

UNITED STATES PATENT AND TRADEMARK OFFICE
CERTIFICATE OF CORRECTION

PATENT NO. : 7,597,668 B2  Page 1 of 1
APPLICATION NO. : 11/444710
DATED : October 6, 2009
INVENTOR(S) : Moshe Yarden It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 146 days.

Signed and Sealed this

Twenty-eighth Day of September, 2010

David J. Kappos
*Director of the United States Patent and Trademark Office*